(12) United States Patent
Wang et al.

(10) Patent No.: US 7,248,546 B2
(45) Date of Patent: Jul. 24, 2007

(54) DATA SLICE GENERATION METHOD AND APPARATUS FOR OPTICAL DISK DRIVE

(75) Inventors: Hao-Yung Wang, Kaohsiung (TW); Chi-Ming Chang, Jhongli (TW)

(73) Assignee: Mediatek Inc., Hsinchu (TW)

( * ) Notice: Subject to any disclaimer, the term of this patent is extended or adjusted under 35 U.S.C. 154(b) by 431 days.

(21) Appl. No.: 10/904,525

(22) Filed: Nov. 15, 2004

(65) Prior Publication Data

US 2005/0128906 A1    Jun. 16, 2005

(30) Foreign Application Priority Data

Dec. 10, 2003   (TW) .............................. 92134921 A

(51) Int. Cl.
*G11B 7/00* (2006.01)
(52) U.S. Cl. ................ 369/47.1; 369/47.21; 369/47.27
(58) Field of Classification Search ............ 369/59.17, 369/47.1, 53.1, 53.2, 53.37, 59.1, 59.18, 369/59.21, 124.01, 47.27, 47.28, 124.15
See application file for complete search history.

(56) References Cited

U.S. PATENT DOCUMENTS 6,614,740 B1 *   9/2003   Park et al. ............... 369/59.17

* cited by examiner

*Primary Examiner*—Nabil Hindi
(74) *Attorney, Agent, or Firm*—Connolly Bove Lodge & Hutz LLP

(57) ABSTRACT

A data slice signal generation method of an optical disk drive, which uses a disk including header areas and data areas of different materials, includes the following steps. First, a data slice signal is generated according to the RF signal read by the optical pickup head of the optical disk drive, and the data slice values, reflecting the central levels of the RF signal, of the data slice signal at the beginnings of the header area and data area are preset. Secondly, when the optical pickup head of the optical disk drive enters a header area or a data area, the data slice signal takes the preset data slice value of the header area or data area, respectively. Then, the data slice signal is adjusted to approach the central levels of the waves of the RF signal by one wave after another.

10 Claims, 6 Drawing Sheets

DATA SLICE GENERATION METHOD AND APPARATUS FOR OPTICAL DISK DRIVE

BACKGROUND OF THE INVENTION (A) Field of the Invention

The present invention is related to a data slice signal generation method and apparatus for an optical disk drive, and more specifically to a data slice signal generation method and apparatus for an optical disk drive applied to a Digital Video Disc-Random Access Memory (DVD-RAM) disk.

(B) Description of the Related Art

Because of the characteristics of the design on DVD-RAM disk, the header areas and the data areas, or namely the user data areas, are made of different materials for recording addresses and data, respectively. The header areas, also called the embossed fields, are evenly distributed on the disk. Both the above-described two areas have different optical reflectivity owing to the different materials, inducing the generated radio frequency (RF) signal when the optical pickup head of the optical disk drive reads data that has an offset between different areas, as shown in FIG. 1(a). As shown in FIG. 1(b), the central line, i.e., central voltage, between the crest and the trough of a wave of an RF signal is hereinafter defined as the central level.

For digitization, a central level signal or namely data slice signal is used for crosscutting the RF signal, the parts larger than the data slice signal are "1," and the others are "0." The data slice signal is adjusted according to the fluctuation of the RF signal and in an attempt to approach the centers of the waves of the RF signal, i.e., the central levels of the waves of the RF signal, by one wave after another. However, because of the offset of the RF signal in the header area and the data area, it is hard to timely adjust the data slice signal to the center of the RF signal wave after changing areas, i.e., the response of the data slice signal will lag behind the RF signal. If the data slice signal deviates from the center of the RF signal wave, the decoding error will occur easily.

Referring to FIG. 2, the header area can be divided into headers 1, 2 and headers 3, 4, where the headers 1, 2 and the headers 3, 4 are adjacent to the different sides of a track. Therefore, if the optical pickup head inclines slightly, it is possible that the RF signal has an offset between the headers 1, 2 and headers 3, 4. Besides the block "data" for data storage, the data area also includes data format blocks such as "Mirror," "Gap," "Guard1," "VFO3," "PS," "PA3," "Guard 2" and "buffer" that are defined by the DVD-RAM specification.

Referring to FIG. 3, each header can be further subdivided into multiple sub-areas. For example, the header 1 includes the address format blocks such as "VFO1," "AM," "PID1," "IED1" and "PA1" that are defined by the DVD-RAM specification.

Traditionally, the data slice signal is obtained according to the central level of previous RF signal wave. This method will not cause problems to the disk of same material such as a CD-ROM or DVD-ROM disk. However, the surface of a DVD-RAM disk has different reflectivities because of the mixture of the header areas and the data areas. Accordingly, the method cannot timely and precisely figure out the central level of the RF signal after changing area, so the probability of decoding error occurrence will be greatly increased.

SUMMARY OF THE INVENTION

The objective of the present invention is to provide a data slice signal generation method and apparatus for an optical disk drive, with a view to solving the problem that the RF signals have offsets in different areas because the DVD-RAM disk has different optical reflectivities in the header areas and the data areas, so the probability of the decoding error occurrence can be decreased.

To accomplish the above-described objective, the present invention discloses a data slice signal generation method of an optical disk drive, where the optical disk drive uses the disk including at least one header area and at least one data area made of different materials, e.g., a DVD-RAM disk. The data slice signal generation method includes the following steps. First, a data slice signal is generated according to the RF signal read by the optical pickup head of the optical disk drive, and the data slice values, reflecting the central levels of the RF signal, of the data slice signal at the beginnings of the header area and data area are preset. Secondly, when the optical pickup head of the optical disk drive enters a header area or a data area, the data slice signal is adjusted to take the preset data slice value of the header area or the data area, respectively. Afterwards, the data slice signal is adjusted to approach the central levels of the waves of the RF signal by one wave after another.

The above-described method uses empirical values to preset the data slice signal that directly takes the data slice value of the header area or the data area, with a view to complying with the change between different areas. In addition, the data slice value of the end of the header area or the data area can also be recorded to act as the data slice value of the beginning of the next header area or the next data area for more accurately approaching the actual reading conditions.

The above-described method can be implemented by a data slice signal generation apparatus for an optical disk drive, which includes a data slice generation circuit, an area changing signal generation circuit, an area level selection circuit, a switch logic circuit and a comparator. The data slice generation circuit receives an RF signal read by the optical pickup head of the optical disk drive so as to generate a data slice signal. The area changing signal generation circuit is used for generating an area changing signal to show whether the optical pickup head switches between the header area and the data area. The area level selection circuit is intended to select the data slice value of the header area or the data area. The switch logic circuit selects the data slice signal or the data slice value as its output based on the area changing signal. The comparator receives the RF signal and the output signal of the switch logic circuit to carry out analog-to-digital conversion.

DETAILED DESCRIPTION OF THE INVENTION

Figure 4:
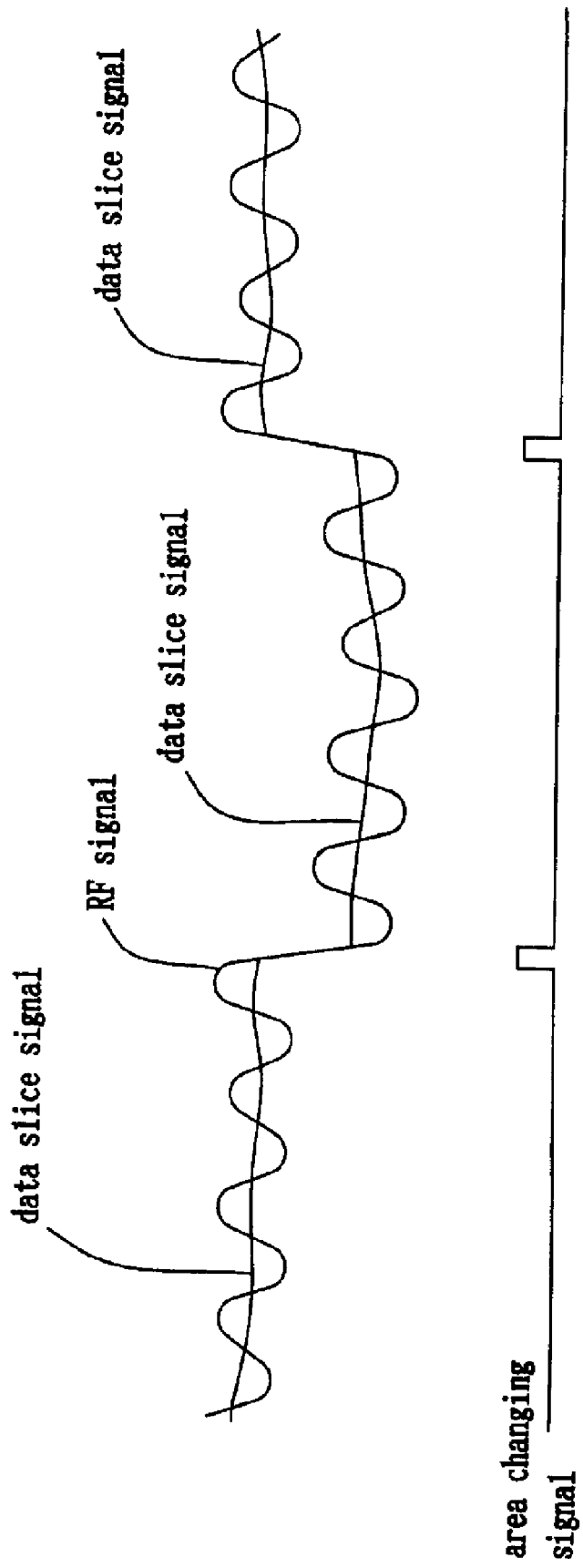
FIG. 4 illustrates the data slice signal generation method in accordance with the present invention.

Referring to FIG. 4, in view of the characteristics of the different optical reflectivity between a header area and a data area of a DVD-RAM disk, when the optical pickup head changes to a different area, the level of the beginning of the header area or the data area of the data slice signal is preset to a value, followed by, in the light of the original manner, adjusting the data slice signal to approach the central levels of the waves of the RF signal. In addition, if the area after changing is relatively short, the data slice signal can be fixed at the preset level so that the adjustment is not needed. The occasion that the data slice signal uses the preset value is based on an area changing signal. The preset value of the data slice signal is obtained based on the experiences of users and the practical conditions, and can be set or controlled by a program.

Besides the way of presetting the level of the data slice signal, i.e., data slice value, by an empirical value, a method to hold the end values of the data slice signal in the header area and the data area also can be employed. Depending upon whether the next step is changed to a header area or a data area, the corresponding data slice value at the end of the header area or data area is set to be the data slice value of the beginning of the next header area or next data area. In other words, the data slice value at the end of the present header area or data area is deemed the data slice value of the beginning of the next header area or the next data area. Even for different header areas (or data areas), they are made of the same materials. Therefore, the data slice values of all the header areas are approximately the same, i.e., there are minor variations of the data slice values among different header areas.

In addition, being similar to the above-described method, the startup levels of the headers 1, 2 and headers 3, 4 of the data slice signal also can be preset, or the data slice values at the end of the previous headers 1, 2 or headers 3, 4 are used, so as to solve the offset problem of the RF signal between the headers 1, 2 and headers 3, 4.

Figure 1A:
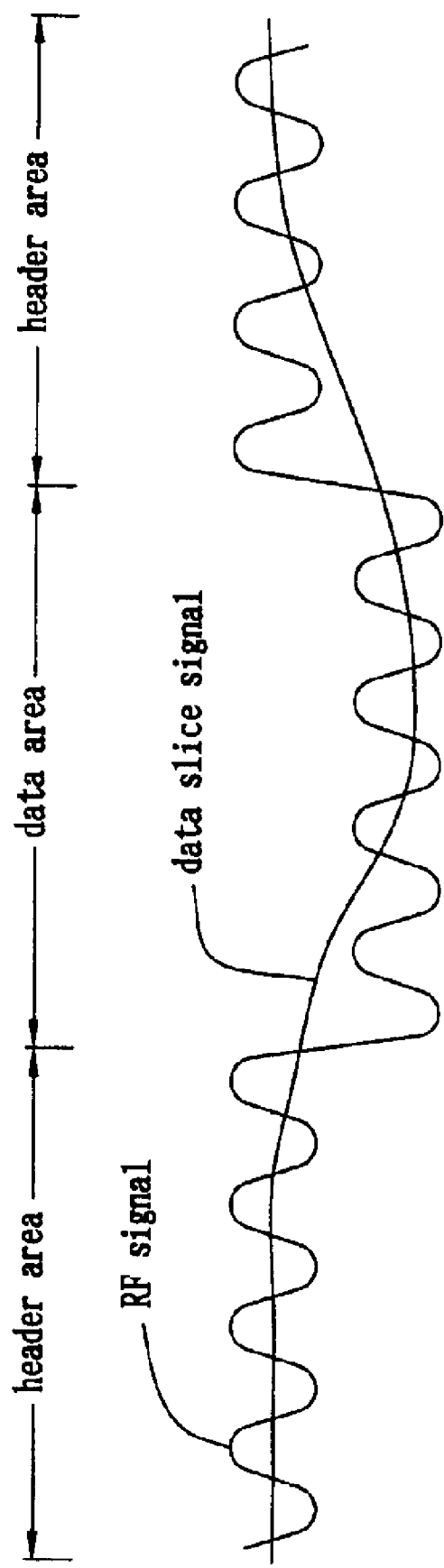
FIG. 1(a) illustrates an RF signal and the relevant data slice signal of a known optical disk drive using a DVD-RAM disk.
Figure 1B:
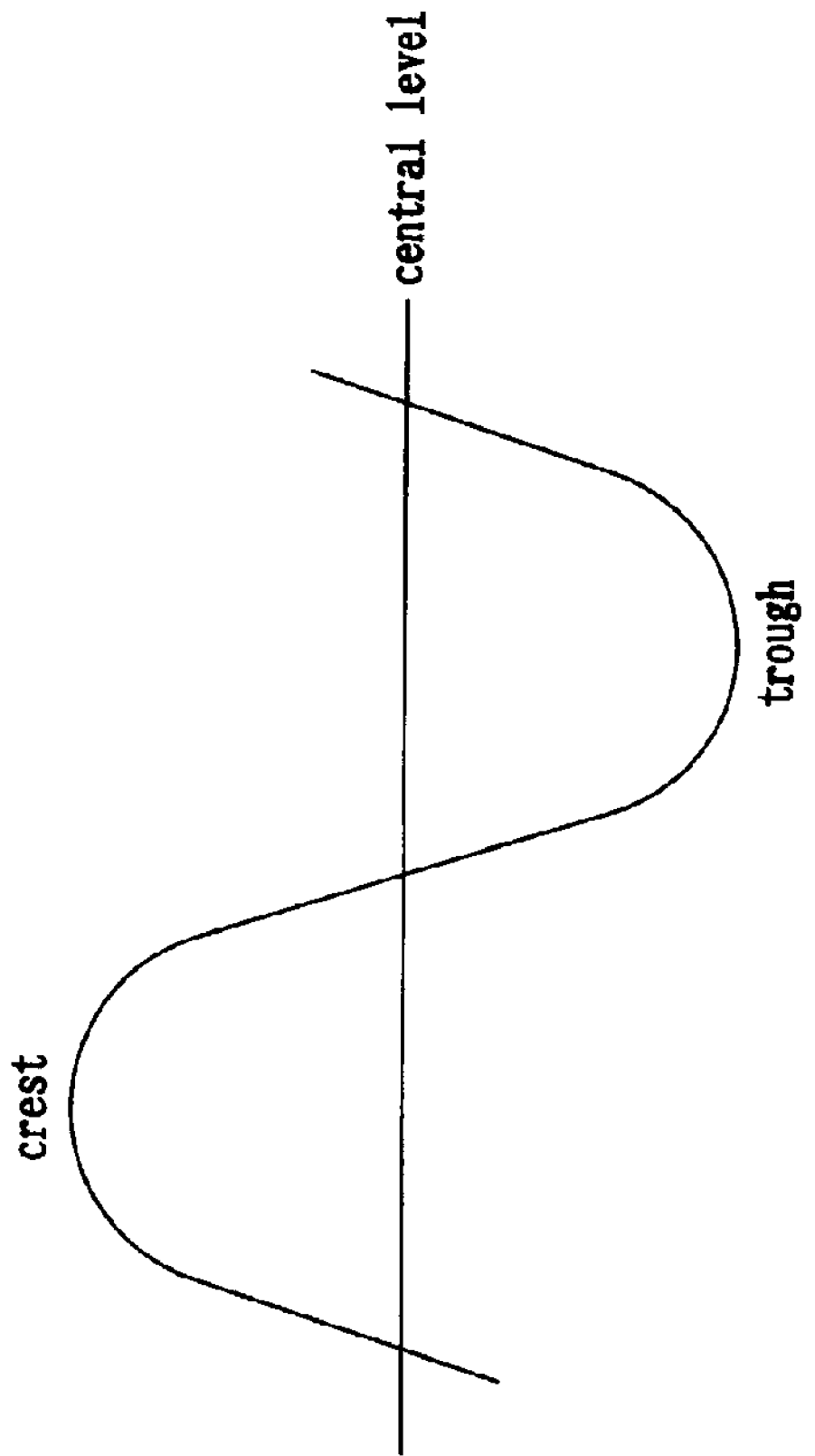
FIG. 1(b) illustrates the definition of central level of a wave of an RF signal.
Figure 2:
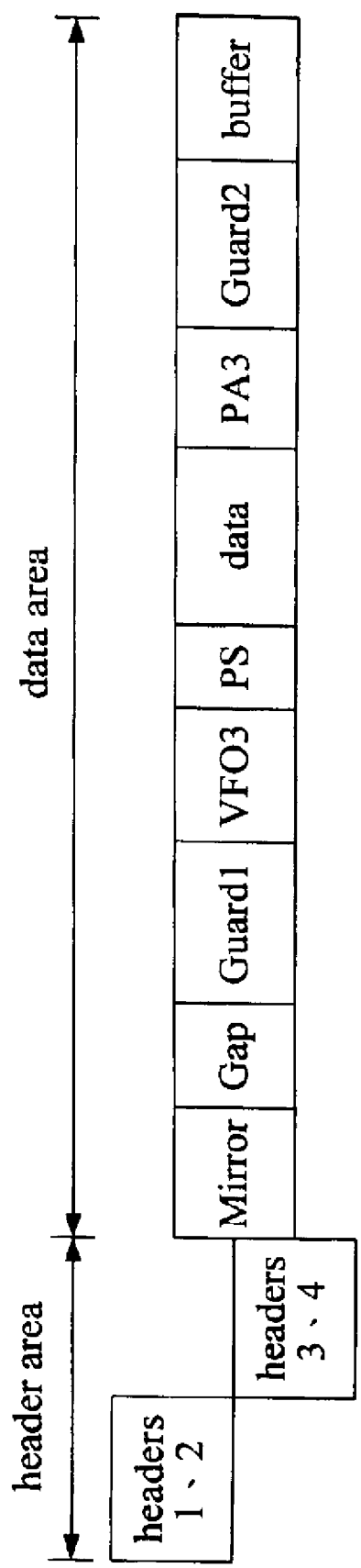
FIGS. 2 and 3 illustrate the format blocks of a DVD-RAM disk.
Figure 3:
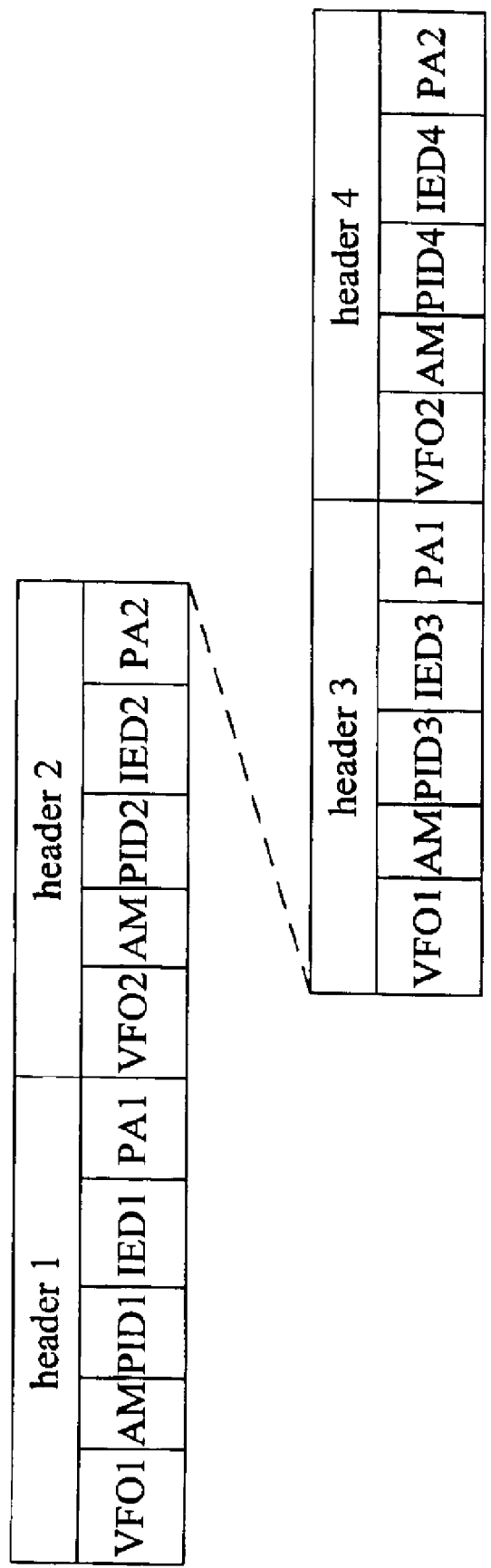

Referring back to FIG. 2 and FIG. 3, for the practical operation, the data slice value at the beginning of the header area or data area can be set in the front blocks of the header or in the format blocks of VFO1, VFO2, VFO3, AM, PS or buffer that are defined by the DVD-RAM specification, i.e., the blocks before and after the "data" block.

Figure 5:
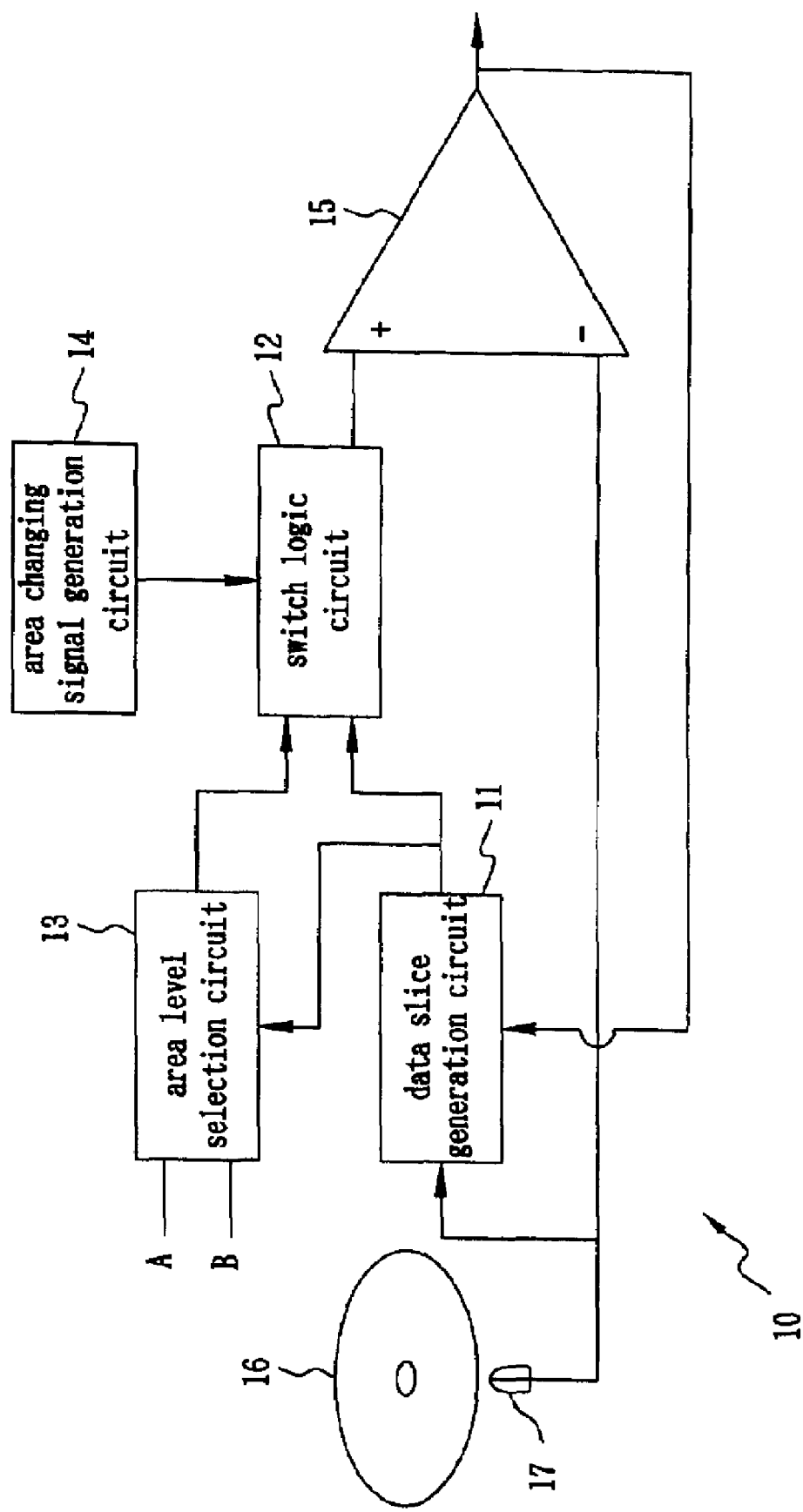
FIG. 5 illustrates the data slice signal generation apparatus in accordance with the present invention.

The data slice signal generation apparatus 10 put forth in the present invention is shown in FIG. 5, with a view to implementing the above-described data slice signal generation method. The data slice signal generation apparatus 10 includes a data slice generation circuit 11, a switch logic circuit 12, an area level selection circuit 13, an area changing signal generation circuit 14 and a comparator 15. The RF signal read from the DVD-RAM disk 16 by an optical pickup head 17 is transmitted to the data slice generation circuit 11, so as to generate a data slice signal. The area level selection circuit 13 is intended to generate a constant level serving as the setting value of the slice data during area changing.

In FIG. 5, the area level selection circuit 13 can select a level A or B, where levels A and B represent the preset data slice values of the header area and the data area, respectively. If the optical pickup head 17 enters the header area from the data area, the area level selection circuit 13 transmits the level A to the switch logic circuit 12; if the optical pickup head 17 enters the data area from the header area, the level B is transmitted to the switch logic circuit 12.

The area level selection circuit 13 also can receive the data slice signal output by the data slice generation circuit 11, and the data slice values at the ends of the header area and the data area respectively substitutes the levels A and B, and are transmitted to the switch logic circuit 12. An area changing signal generated by the area changing signal generation circuit 14 is input to the switch logic circuit 12 to indicate whether the optical pickup head 17 switches areas.

Referring back to FIG. 4, when the area changing signal is at high level, it indicates that the optical pickup head 17 is changing the areas, and the area level selection circuit 13, as described above, will send a constant level to the switch logic circuit 12 based on whether the optical pickup head 17 is in the header area or the data area. In contrast, when the area changing signal is at low level, it indicates that the optical pickup head 17 is not changing areas, and the switch logic circuit 12 will only receive the data slice signal sent by the data slice generation circuit 11. In other words, when the area changes, the switch logic circuit 12 selects the constant level output by the area level selection circuit 13, whereas the data slice signal output by the data slice generation circuit 11 is selected when the area does not change.

Whether the present optical pickup head is in the header area or the data area is determined by another technique that, however, is not described in detail here, because it is not the emphasis of the present invention. The comparator 15 receives the output of the switch logic circuit 12 and the RF signal for carrying out analog-to-digital conversion. The output of the comparator 15 can be fed back to the data slice generation circuit 11 for adjustment in real time.

The above-described embodiments of the present invention are intended to be illustrative only. Numerous alternative embodiments may be devised by those skilled in the art without departing from the scope of the following claims.

What is claimed as new and desired to be protected by Letters Patent of the United States is:

1. A data slice signal generation method for an optical disk drive, each of optical disks used in the optical disk drive including at least one header area and at least one data area made of different materials, the method comprising the steps of:

generating a radio frequency signal read by an optical pickup head of the optical disk drive, wherein the radio frequency signal comprises multiple waves;

presetting data slice values in the beginnings of the header area and the data area, wherein the data slice values in the beginning of the header area and the data area respectively reflect the central levels of the multiple waves in the header area and the data area;

generating a data slice signal based on the radio frequency signal, wherein an initial value of the data slice signal is assigned by the preset data slice value in the beginning of the header area when the optical pickup head enters the header area, and assigned by the preset data slice value in the beginning of the data area when the optical pickup head enters the data area; and adjusting the data slice signal to approach to the central levels of the multiple waves of the radio frequency signal by one wave after another.

2. The data slice signal generation method for an optical disk drive in accordance with claim 1, wherein the header area includes a first header and a second header and the first header and the second header are adjacent to the different sides of a track of the optical disk, and wherein the preset data slice value in the beginning of the header area is selected from the data slice values in the beginnings of the first header and the second header.

3. The data slice signal generation method for an optical disk drive in accordance with claim 1, which is applied to a DVD-RAM disk.

4. The data slice signal generation method for an optical disk drive in accordance with claim 3, wherein the data slice signal takes the preset data slice value in the VFO1, VFO2, VFO3, AM, PS or buffer of the DVD-RAM disk.

5. A data slice signal generation method for an optical disk drive, each of optical disks used in the optical disk drive including header areas and data areas made of different materials, the method comprising the steps of:
   generating a data slice signal based on a radio frequency signal read by an optical pickup head of the optical disk drive, wherein the radio frequency signal comprises multiple waves;
   recording data slice values of the data slice signal in the end of the header area and the data area;
   adjusting the data slice signal to take the recorded data slice value in the end of the header area when the optical pickup head enters the next header area, and to take the recorded data slice value in the end of the data area when the optical pickup head enters the next data area; and
   adjusting the data slice signal to approach to central levels of the multiple waves of the radio frequency signal by one wave after another.

6. The data slice signal generation method for an optical disk drive in accordance with claim 5, wherein the header area includes a first header and a second header and the first header and the second header are adjacent to the different sides of a track of the optical disk, and wherein the recorded data slice value in the end of the header area is selected from the data slice values in the ends of the first header and the second header.

7. The data slice signal generation method for an optical disk drive in accordance with claim 5, which is applied to a DVD-RAM disk.

8. The data slice signal generation method for an optical disk drive in accordance with claim 7, wherein the data slice signal takes the preset data slice value in the VFO1, VFO2, VFO3, AM, PS or buffer of the DVD-RAM disk.

9. A data slice signal generation apparatus for an optical disk drive, optical disks used in the optical disk drive including header areas and data areas made of different materials, the apparatus comprising:
   a data slice generation circuit which receives a radio frequency signal read by an optical pickup head of the optical disk drive to generate a data slice signal;
   an area changing signal generation circuit for generating an area changing signal so as to indicate whether the optical pickup head switches between the header areas and the data areas;
   an area level selection circuit for selecting the data slice values of the data slice signal in the header areas or in the data areas;
   a switch logic circuit which selects the data slice signal or the data slice values as the output based on the area changing signal; and
   a comparator which receives the radio frequency signal and the output of the switch logic circuit to conduct an analog-to-digital conversion.

10. The data slice signal generation apparatus for an optical disk drive in accordance with claim 9, which is applied to a DVD-RAM disk.

* * * * *